March 17, 1953 — L. H. METZGER — 2,631,579
PORTABLE COOKING GRILL
Filed May 19, 1949 — 2 SHEETS—SHEET 1

Inventor
Leopold H. Metzger
By Fred Gerlach Atty.

March 17, 1953   L. H. METZGER   2,631,579
PORTABLE COOKING GRILL
Filed May 19, 1949   2 SHEETS—SHEET 2
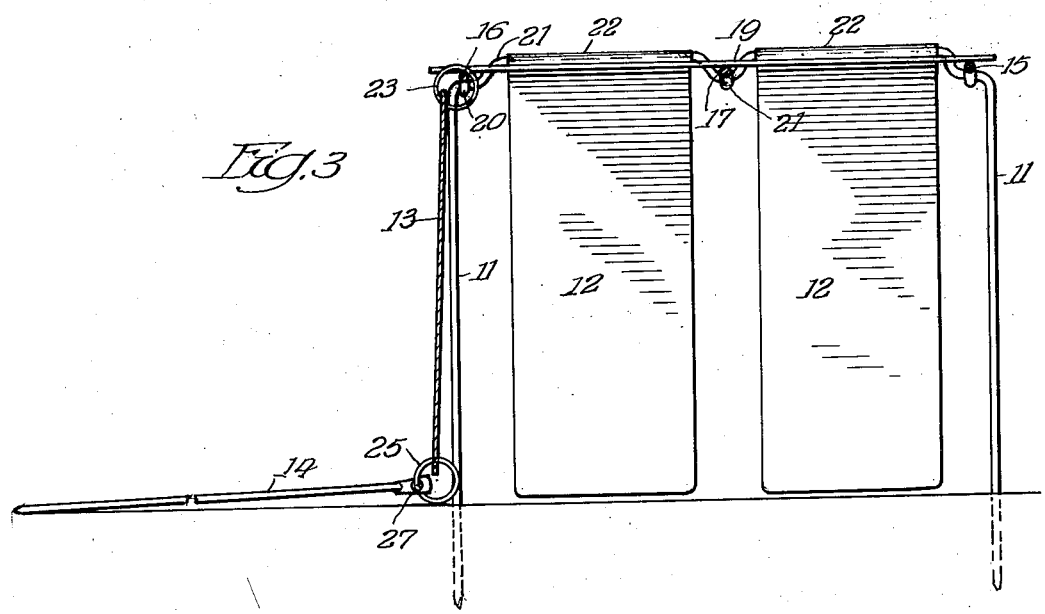
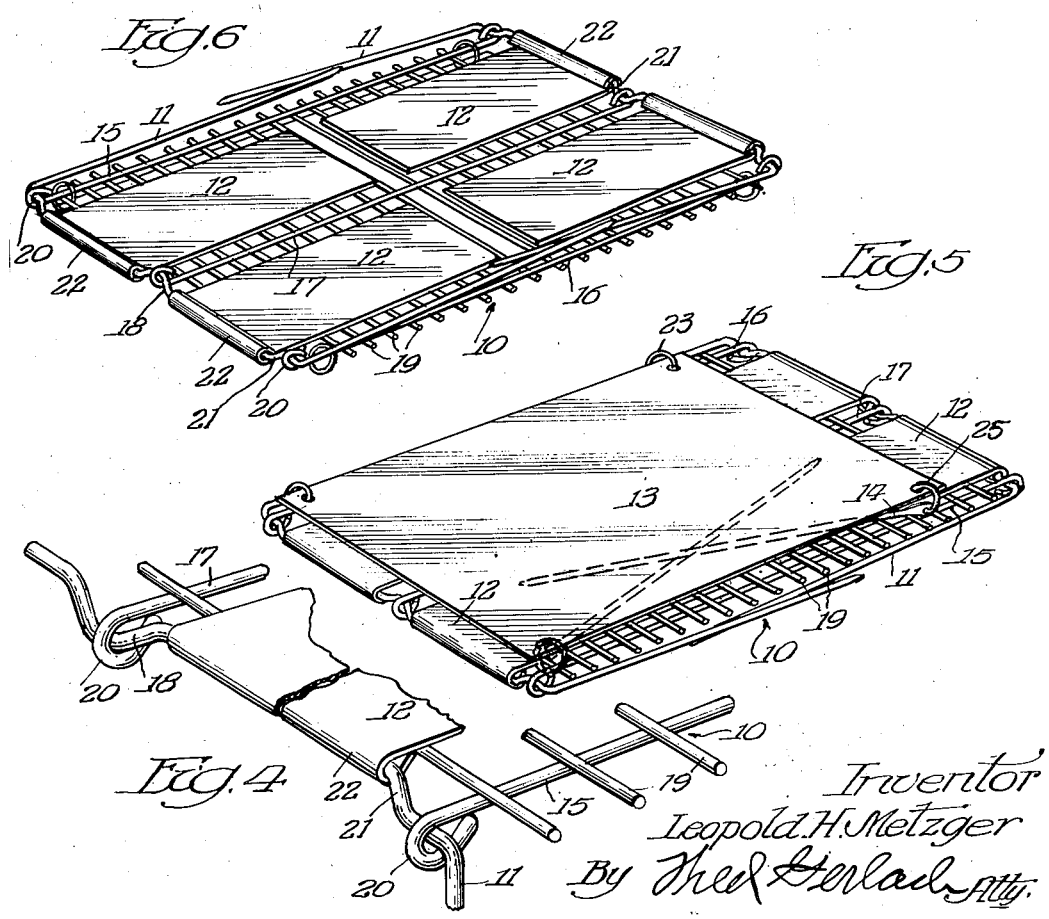
Inventor
Leopold H. Metzger Patented Mar. 17, 1953

2,631,579

UNITED STATES PATENT OFFICE 2,631,579

PORTABLE COOKING GRILL

Leopold H. Metzger, Chicago, Ill.

Application May 19, 1949, Serial No. 94,075

3 Claims. (Cl. 126—29)

The present invention relates generally to portable grills for use in cooking. More particularly the invention relates to that type of portable cooking grill which is adapted for use over a camp fire; comprises a rectangular wire formed frame and four stake-like legs which are located at the corners of the frame, serve to hold the frame in elevated position with respect to the ground over which the fire is built, and are pivotally connected at their upper ends so that when the grill is not in use they may be folded into parallel relation with the frame.

One object of the invention is to provide a portable cooking grill of this type which is an improvement upon, and has certain inherent advantages over, previously designed grills and is characterized by simplicity of design, efficiency of operation and low cost of manufacture.

Another object of the invention is to provide a portable cooking grill of the type under consideration in which each end member of the frame has hinged or pivotally connected to it two side by side imperforate substantially rectangular plates which may be selectively swung back and forth between a downwardly extending or depending position wherein they serve to protect the fire under the frame against wind from the end of the frame and a position wherein they overlie the frame and may be used as skillets in connection with cooking of meat or other food.

Another object of the invention is to provide a grill of the type and character under consideration in which the rear longitudinal member of the frame has hinged or pivotally connected to it a flat imperforate rectangular plate which has stake-like legs hinged to its outer corners, is capable of being supported by the legs in a horizontal position wherein it is disposed behind and in coplanar relation with the frame and forms a table for supporting food preparatory or after cooking, and is also capable of being swung downwards into different angular positions so as to afford to the fire as much or as little wind protection as desired.

Another object of the invention is to provide a portable cooking grill of the aforementioned character in which the longitudinally extending front and rear members of the rectangular frame have the ends thereof bent to form eyes, the ends of the transversely extending end members of the frame are rotatably mounted in the eyes and the upper ends of the four frame supporting legs are fixedly connected to the ends of, and extend at right angles to, the frame end members and are pivotally supported with respect to the frame by the end members.

A further object of the invention is to provide a portable cooking grill in which the frame end members have laterally offset portions which are loosely surrounded by pivot sleeves on the proximal ends of the end plates and when the four frame supporting legs are in their operative position extend upwards to the end that the end plates will, when swung into their skillet forming position over the frame, lie flatly on the frame.

A still further object of the invention is to provide a portable cooking grill which is generally of new and improved construction in which all of the parts thereof may be folded flatly against the frame when the grill is not in use.

Other objects of the invention and the various advantages and characteristics of the present portable cooking grill will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 3 is an end elevation showing the back plate swung completely down so as to form a complete windbreak at the back of the frame;

Figure 1:
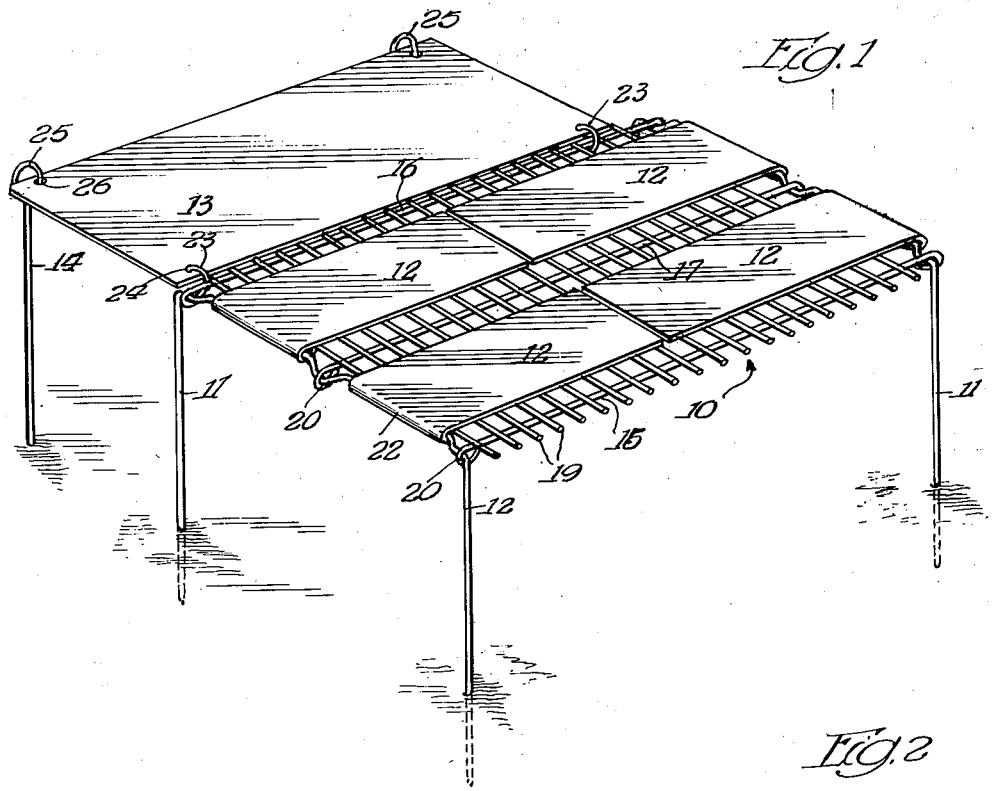
Figure 1 is a front perspective showing a portable cooking grill embodying the invention in one of its operative positions and with the end plates in their skillet forming position over the and the back plate in its table forming position wherein it extends horizontally and is in coplanar relation with the frame.

Figure 4 is an enlarged fragmentary perspective of one corner of the frame illustrating in detail the manner in which the frame end members are rotatably mounted in the eyes at the ends of the longitudinally extending members of the frame, also illustrating the manner in which the end plates are hinged or pivotally connected to the frame end members and the stake-like supporting legs for the frame are connected to the ends of the end members of the frame; and Figures 5 and 6 are, respectively, top and bottom perspectives showing the grill in its folded position.

The grill which is shown in the drawing constitutes the preferred form or embodiment of the invention. It is adapted for use over a campfire and as its principal component parts comprises a rectangular openwork frame 10, four frame supporting legs 11, four end plates 12, a back plate 13 and a pair of legs 14 for supporting the back plate in different angular positions. As hereinafter described more in detail the grill is capable of being folded into a compact unit when it is not in use.

The frame 10 is adapted when the grill is in use to overlie the campfire and consists of a front member 15, a back member 16, an intermediate member 17, a pair of end members 18 and a series of crossmembers 19. Preferably all of these members are formed of stiff wire or rod stock of circular cross section. The front, back and intermediate members 15, 16 and 17 extend lengthwise of the frame and are arranged or disposed in parallel relation. The intermediate member is positioned mid-way between the front and back members. The ends of the front, back and intermediate members are bent downwards, inwards and upwards to form substantially circular eyes 20. The end members 18 of the frame extend at right angles to the front, back and intermediate members and form the ends of the frame 10. The contral portions of the end members 18 extend loosely through the eyes at the ends of the intermediate member 17 and the ends of the end members extend loosely through the eyes at the ends of the front and back members of the frame and hence the end members are supported rotatably. The portions of the end members that are disposed between the front, back and intermediate members 15, 16 and 17 of the frame are deformed or bent to form U-shaped parts 21, the crosspieces of which are laterally offset with respect to the portions of the end members that extend through, and are rotatably mounted in the substantially circular eyes at the ends of the front, back and intermediate members. The frame crossmembers are disposed between the frame end members and are spaced equidistantly apart. They overlie and extend at right angles to the front, back and intermediate members of the frame and have the central portions thereof welded to the subjacent portions of the intermediate member 17 and their end portions welded to the subjacent portions of the front and back members. The last mentioned members of the frame are held or maintained in rigid connected relation by the crossmembers. When the grill is in use the frame 10 serves as a medium for supporting over the fire pots and pans. In addition, it may be used to support large sized pieces of meat in connection with a charcoal broiling operation.

The legs 11, like the various members of the frame, are formed of stiff wire or rod stock. They are located at the corners of the frame and have the upper ends thereof formed integrally with the ends of the frame end members 18. The lower ends of the legs 11 are pointed so that they may be pushed or driven into the ground. As clearly shown in the drawings the legs 11 extend at an angle of 180° with respect to the U-shaped parts 21 of the frame end members. By reason of the fact that the upper ends of the legs are formed integrally with the ends of the frame end members and such members are mounted rotatably by way of the eyes 20 the legs may be swung inwards and upwards into a folded position wherein they are in parallel relation with the frame and also downwards and outwards into an operative position wherein they extend at right angles to, and serve to support, the frame in an elevated position over the campfire. When it is desired to use the grill the legs are swung into their aforementioned operative position and are then driven downwards so as to embed their lower ends into the ground. Preferably the length of the legs is greater than half the length of the front, back and intermediate members of the frame. As shown in the drawings the U-shaped parts 21 of the end members 18 extend upwards when the legs 11 are in their operative position. The cross-pieces of the U-shaped parts are disposed immediately above the crossmembers 19 of the frame when the U-shaped parts extend upwards as the result of the legs 11 being in their operative position.

The end plates 12 of the grill are formed of any suitable metal, such, for example, as stainless steel. They are rectangular so far as shape or configuration is concerned and are approximately half as long as the front, back and intermediate members of the frame and slightly less than half as wide as the frame end members as shown in the drawings. The end plates 12 are imperforate and have certain ends thereof bent to form substantially cylindrical pivot sleeves 22. The latter extend loosely around the crosspieces of the U-shaped parts 21 of the frame end members and serve so pivotally to support the end plates that the latter are capable of being swung back and forth between a depending position wherein they serve as wind breaks at the ends of the frame (see Figure 1) and a skillet forming position wherein they overlie and rest on the crossmembers 19 of the frame. When in their skillet forming position the end plates 12 may be used as supports for hamburgers and other food products in connection with cooking thereof by the campfire under the frame. The end plates 12 may be selectively swung into and out of their skillet forming position. Due to the fact the the crosspieces of the U-shaped parts 21 of the frame end members are disposed immediately above the crossmembers 19 of the frame when the legs 11 are in their operative position the end plates 12 when in their skillet forming position over the grill frame rest flatly on the frame crossmembers. When the grill is not in use the end plates 12 are folded under the frame 10, as best shown in Figure 6.

The back plate 13 is rectangular. It is formed of any suitable metal, such as stainless steel or aluminum, and, as shown in the drawings, is imperforate. The length of the back plate is substantially the same as the length of the frame 10 and the width of the back plate is substantially equal to the length of the end plates. The front corners of the back plate 13 are pivotally connected to the ends of the back member 16 of the frame by split rings 23. The latter are preferably of the type that are used in connection with looseleaf note books. They extend around the ends of the back member 16 of the frame and through holes 24 in the front corners of the back plate and permit the back plate to be swung upwards into a horizontal position wherein it is disposed in back of, and in coplanar relation with, the frame 10 and serves as a table for supporting food preparatory to, and after, cooking, and downwards into different angular positions wherein it serves as a wind break at the back of the frame. When the grill is not in use the back plate 13 is swung over the frame 10, as shown in Figure 5 of the drawings.

Figure 2:
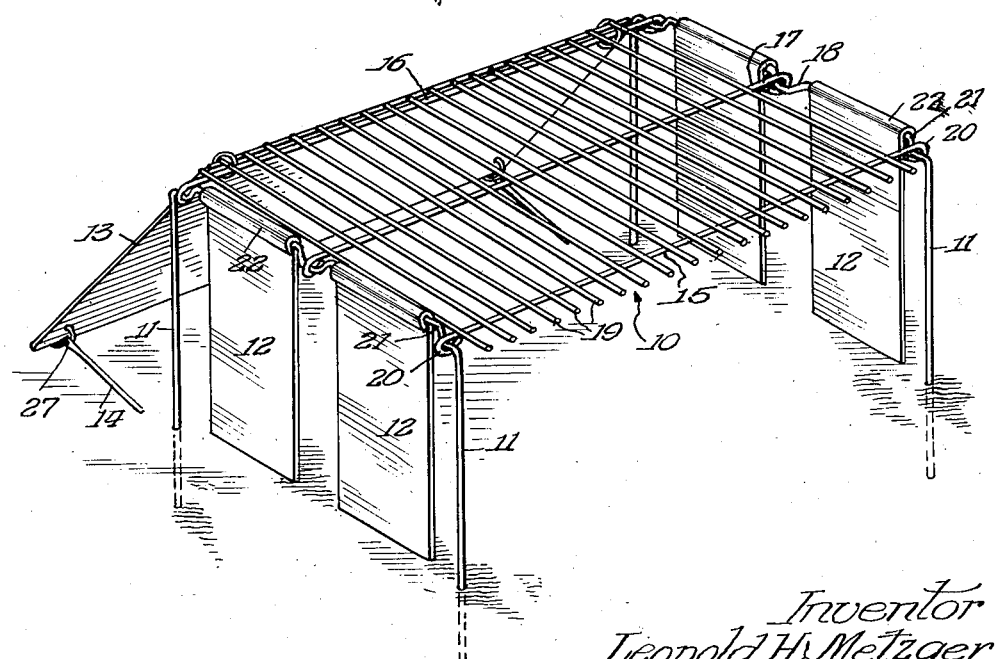
Figure 2 is a front perspective showing the grill with the end plates thereof swung downwards to form windbreaks at the ends of the frame and the back plate swung half way downwards so as to form a partial wind-break at the back of the frame.

The legs 14 are the same in length as the frame supporting legs 11 and serve to support the back plate 13 in its table forming position and also in all of its wind break positions, except its vertical wind break position. The upper ends of the legs 14 are pivotally connected to the rear corners of the back plate 13 by split rings 25 which are like the rings 23 and extend through holes 26 in the rear corners of the back plate 13 and holes 27 in the upper ends of the legs 14. The lower ends of the legs 14 are pointed in order that they may be pushed or driven into the ground. When it is desired to support the back plate 13 in its table forming position the legs 14 are vertically positioned, as shown in Figure 1. If it is desired to utilize the back plate as a partial wind break for the fire the legs are swung forwards into an angular position and then driven into the ground as shown in Figure 2. When it is desired to use the back plate as a complete wind break it is swung downwards into a vertical position. In such position it is contemplated that the legs 14 will rest flatly on the ground as shown in Figure 3. By adjusting the angular position of the back plate with respect to the horizontal such plate will afford as much or as little wind protection as desired. When the grill is not in use the legs 14 are swung under the back plate as shown in Figure 5.

When it is desired to use the grill the frame supporting legs 11 are swung downwards into a right angle position with respect to the frame 10 and their lower ends are pushed into the ground. Thereafter the back plate 13 is swung into the desired position and maintained in such position by embedding the lower ends of the legs 14 into the ground. If it is desired to protect the fire under the frame from wind from the back and sides the side plates 12 and the end plate 13 are swung downwards. Should the user of the grill desire to cook a hamburger, for example, one of the end plates 12 is swung over the frame into its skillet forming position. When it is desired to store or transport the grill the legs 11 and 14 are withdrawn from the ground and the various pivotally mounted parts of the grill are folded into the position shown in Figures 5 and 6.

The herein described portable cooking grill effectively and efficiently fulfills its intended purpose and due to its particular design or construction may be produced at a comparatively low cost. It is capable of being readily adjusted for use and when not in use occupies but a comparatively small space. One special or particular advantage of the present portable cooking grill resides in the fact that the end plates 12 are spaced laterally apart and hence, regardless of how many are used, there are spaces which permit the smoke from the fire to contact the food product or products on the side plates being used to impart flavor thereto. In the use of a portable cooking grill to cook hamburgers or similar food products it has been found in practice that in the event the hamburgers are of crumbly consistency they cannot be cooked on the crossmembers 19. With the present grill it is possible by use of the end plates 12 efficiently to cook hamburgers which are crumbly or non-rigid due to too much moisture while at the same time enabling them to receive flavor from the smoke emanating from the fire.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a portable cooking grill adapted for use in connection with a campfire on the ground, and comprising a metallic rectangular open work frame consisting of front and rear members, an end member connected to, and extending between, certain ends of the front and back members, a second end member connected to, and extending between, the other ends of said front and back members and embodying between its ends a U-shaped part, and a series of spaced apart crossmembers having the ends thereof resting on, and connected to, the front and back members, stake-like legs designed to support the frame in an elevated position with respect to the ground and having the upper ends thereof connected to the corners of the frame, and a rectangular imperforate metallic end plate of less length than the legs, having one end thereof bent to form a sleeve which extends loosely around the crosspiece of the U-shaped part and forms therewith a pivotal connection whereby the end plate is permitted to swing back and forth between a wind break position wherein it depends from, and is parallel to, said second end member and a skillet forming position wherein it rests flatly on certain of the cross members of the frame.

2. As a new article of manufacture, a portable cooking grill adapted for use in connection with a campfire on the ground, and comprising a metallic rectangular open work frame consisting of front and rear members with eyes on their ends, an end member extending between certain ends of the front and back members and having its ends journalled in the eyes of said certain ends of the front and rear members so that it is supported rotatably, a second end member extending between the other ends of said front and rear members, having its ends journalled in the eyes on said other ends of the front and rear members so that it is supported rotatably, and embodying between its ends a pair of spaced apart U-shaped parts, and a series of spaced apart crossmembers having the ends thereof resting on, and connected to, the front and back members, four stake-like legs designed to support the frame in an elevated position with respect to the ground, having the upper ends thereof fixedly connected to the ends of the end members of the frame, and adapted when the grill is not in use to be folded into parallel relation with said frame, and a pair of laterally spaced rectangular imperforate metallic end plates of less length than the legs and of less combined width than the frame, having certain ends thereof bent to form sleeves which extend loosely around said crosspieces of said U-shaped parts, respectively, and form therewith pivotal connections whereby the end plates are permitted selectively to be swung back and forth between a wind break position wherein they depend from, and are parallel to, said second end member and a skillet forming position wherein they rest flatly on certain of the frame crossmembers.

3. As a new article of manufacture, a portable cooking grill adapted for use in connection with a campfire on the ground and comprising a metallic rectangular open work frame embodying longitudinally extending rod variety front and rear members disposed in spaced apart and parallel relation and having the ends thereof shaped to form eyes, a pair of transversely extending rod variety end members extending between the ends of the front and rear members, having the ends thereof extending through, and mounted rotatably in, the eyes, and provided between their ends with U-shaped parts, and a plurality of spaced apart crossmembers arranged in parallel relation with the end members and having the ends thereof resting on, and secured to, said front and rear members, stake-like legs designed to support the frame in an elevated position with respect to the ground, having the upper ends thereof fixedly connected to the ends of the end members lying in the same plane as, but projecting oppositely to, said U-shaped parts and adapted when the grill is not in use to be swung towards one another into lapped relation with said front and rear members, and a pair of rectangular metallic end plates of less length than the legs, having certain ends thereof bent to form substantially cylindrical sleeves which extend loosely around the crosspieces of the U-shaped parts and form therewith pivotal connections whereby the end plates are permitted to swing back and forth between a wind break position wherein they depend from the end members of the frame and a skillet forming position wherein they rest flatly on certain of the frame crossmembers.

LEOPOLD H. METZGER.

REFERENCES CITED

The following references are of record in the file of this patent:

UNITED STATES PATENTS

| Number | Name | Date |
|---|---|---|
| 1,403,842 | Chambers | Jan. 17, 1922 |
| 1,435,747 | Seiling | Nov. 14, 1922 |
| 1,484,476 | Currie | Feb. 19, 1924 |
| 1,778,330 | Mayer | Oct. 14, 1930 |